Figure 1:
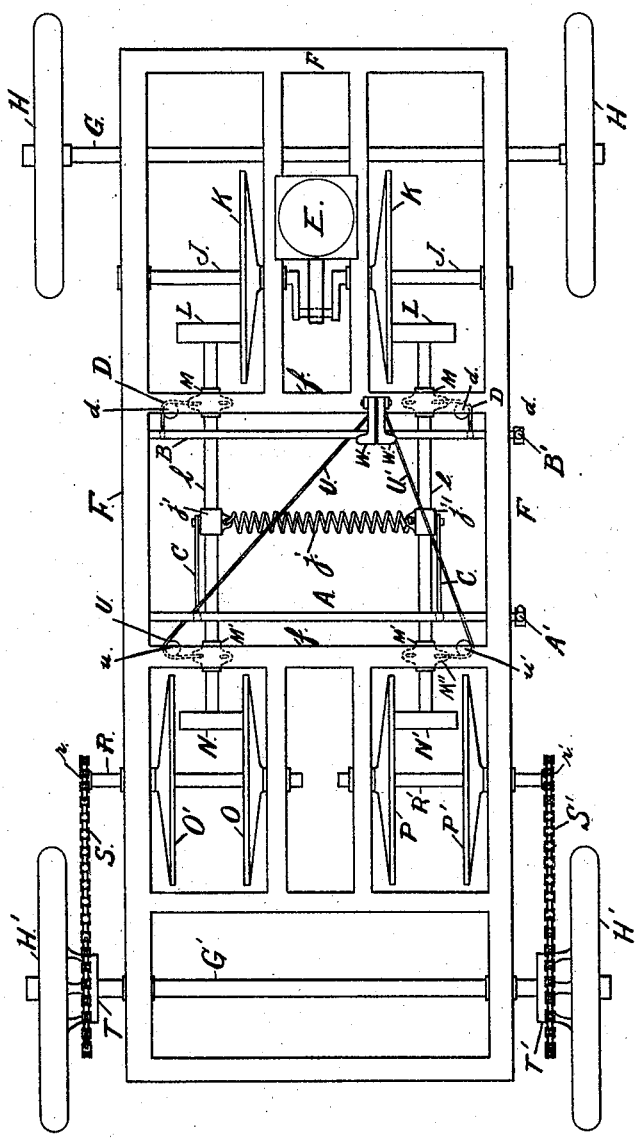

No. 806,302. PATENTED DEC. 5, 1905.
Z. B. STARR.
TRANSMISSION MECHANISM FOR AUTOMOBILES.
APPLICATION FILED AUG. 12, 1904.

2 SHEETS—SHEET 1.

Witnesses
Lottie Prior
Mac Flood

Inventor
Zadock B. Starr
by
Ward Cameron. Attys.

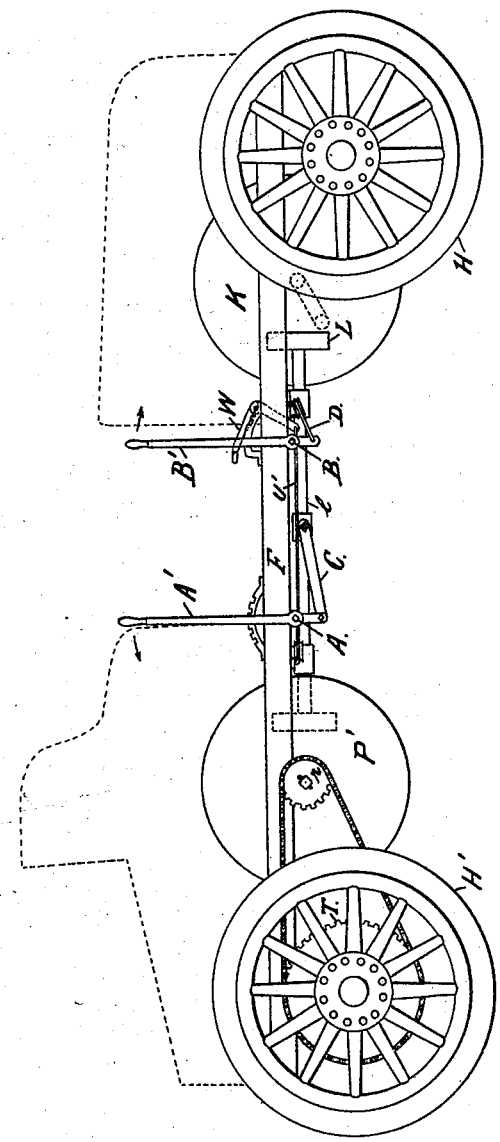

UNITED STATES PATENT OFFICE.

ZADOCK B. STARR, OF GLOVERSVILLE, NEW YORK.

TRANSMISSION MECHANISM FOR AUTOMOBILES.

No. 806,302. Specification of Letters Patent. Patented Dec. 5, 1905.

Application filed August 12, 1904. Serial No. 220,554.

*To all whom it may concern:*

Be it known that I, ZADOCK B. STARR, a citizen of the United States of America, and a resident of the city of Gloversville, county of Fulton, and State of New York, have invented certain new and useful Improvements in Transmission Mechanism for Automobiles, of which the following is a specification.

My invention relates to automobiles; and the object of my invention is to provide a friction propelling device by means of which an automobile may be operated and its speed accelerated or decreased, together with such other elements and combinations as are hereinafter more particularly set forth and claimed. I accomplish these objects by means of the mechanism illustrated in the accompanying drawings, in which—

Figure 1 is a plan; Fig. 2, a side elevation of an automobile provided with my invention.

Similar characters refer to similar parts throughout both the views.

I mount an engine E within the frame F of an automobile in any suitable manner, frame F being mounted upon axles G G', respectively, said axles carrying the wheels H H H' H', respectively. The crank-shaft J of the engine is provided with disks K K, one on each side of the center line of the automobile, engaging with which I arrange the friction-rollers L L, respectively, each friction-roller being mounted upon a shaft $l\ l$, respectively, each shaft being suitably mounted in bearings M M', attached to the cross-pieces $f f$, respectively, of the frame F, the bearings M M' of said shaft $l\ l$ being capable of a sliding motion transversely to the frame F for the purpose of enabling the friction-rollers L to be moved away from contact with the disks, respectively, when desired. On the shaft $l\ l$ I also mount friction-rollers N N', respectively, which are adapted to engage with disks O O' and P P', respectively, each friction-roller N N' being placed one between a pair of disks O O' and the other between the pair of disks P P'. The movement of the bearings M' M' will cause the friction-rollers N N' to break contact with one of the disks, a further movement causing it to engage with the other of said pair. The disks O O' are mounted on a shaft R, which carries a sprocket $r$, with which engages the chain S, which is attached to and engages a sprocket T on the wheel H. The disks P P' are mounted on the shaft R', carrying a sprocket $r'$, to which the chain S' engages with the sprocket T' on the wheel H'. As thus arranged the revolution of the disks K K, caused by the operation of the engine E, will impart revolution to the friction-rollers L L and N N'. These in turn will set in motion the friction-disks O' and P, which will, through the connecting-chains S S', impart motion to the wheels H' H' of the automobile. Should it become necessary to reverse the machine, the rollers N N' should be moved transversely, so as to engage the disks O' P', respectively, causing the wheels H' H' of the automobile to move in the opposite direction.

In order to change the degree of speed, it is necessary to move the friction-rollers to such position that they will be nearer to the axle or nearer to the circumference of the disks, depending upon whether the operator wishes to increase or diminish the speed.

To stop the machine, it is necessary to break the connection between the friction-rollers L L and their respective disks K K.

It will be noticed that I place a spiral spring $j$ between and connected with the shafts $l\ l$, the action of the spring tending to draw the shafts toward each other. This action of spring $j$ will tend to hold in contact the friction-rollers L L with their respective disks K K.

For the purpose of separating the rollers L L from the disks K K, I preferably attach chains or straps D D, of any suitable kind, to the bearings M M, respectively, each of said chains passing over a sheave $d\ d$, respectively, and attached to the rod B. To the rod B, I attach a handle-bar B', by moving which in the direction shown by the arrow in Fig. 2 the friction-rollers L L will be separated from the disks K K, respectively. When the hand is removed from the handle-bar B', the spring $j$ will bring the friction-rollers again in contact with the disks. For the purpose of holding the friction-rollers away from the disks it is necessary to arrange a stop (not shown) for engaging with the handle-bar B' when it is forced forward.

For the purpose of moving the friction-rollers N N', respectively, from contact with their disks O O' P P', I attach one end of a chain or strap U to the bearings M', letting the same pass over the sheave $u$ and be attached to a bell-crank lever W, Fig. 2, mounted in frame F. The other arm of said bell-crank lever, extending above the floor of the car or motor, is arranged for a pedal, by the operation of which when the pedal is depressed the arm of the bell-crank lever to which the chain U is attached will be forced forward, which will draw the roller out of contact with the disk O, and, if desired, further pressure will bring the roller end in contact with the disk O'. I have arranged a similar bell-crank lever W', chain U', and sheave $u'$, the chain U' being attached to the bearings $M^2$, the operation of which is the same and for the same purpose as that just described in connection with the friction-roller engaging with the disks O O', the difference being simply that the movement of the bell-crank lever W' causes the friction-roller N' to separate from the disk P, a further movement causing it to engage with the disk P'.

For the purpose of changing the speed of the machine I attach the bars C C to the rod A, the other end of said bars being attached to the collars $j'$ $j'$, respectively, which collars are immovably secured to the shafts $l$ $l$, respectively. The end of the rod A is squared and carries a handle A'. By drawing the handle in the direction shown by the arrow the rollers N N' are brought nearer the circumference of the disks O O' P P', respectively, and at the same time the disks L L are brought nearer the axis of the disks K K, respectively, thus decreasing the speed of the machine. Moving the handle-bar A' in the opposite direction will increase the speed of the machine.

It will be noticed that in moving the friction-rollers L, N, and N' away from their respective disks it is necessary to overcome the action of the spring $j$ and also the tendency of the bars C C to hold the shafts $l$ $l$ in a fixed position. These bars are so arranged that they are capable, however, of a transverse movement.

What I claim as my invention, and desire to secure by Letters Patent, is—

1. In an automobile; a pair of disks; a crank-shaft upon which said disks are mounted; two shafts; a friction-roller at each end thereof; two pairs of disks; connections between each shaft carrying said pairs of disks with the rear wheel of the automobile; said friction-rollers mounted in such a manner that one roller on each shaft shall engage the disks mounted on the crank-shaft on opposite sides thereof; the other friction-roller on each shaft engaging one of the pairs of disks, respectively, substantially as described.

2. In an automobile; a pair of disks; a crank-shaft upon which said disks are mounted; a pair of friction-rollers adapted to engage the opposite sides of said disks; shafts on which said friction-rollers are mounted; straps engaging collars on said shafts; sheaves over which said straps pass; a rod to which said straps are secured; a handle-bar connected with said rod, by the operation of which said friction-rollers may be disengaged from said disks; substantially as described.

3. In an automobile; a pair of disks; a crank-shaft upon which said disks are mounted; a pair of friction-rollers adapted to engage the opposite sides of said disks; shafts upon which said friction-rollers are mounted; a second friction-roller carried by each of said shafts; a pair of disks, between which each of said second friction-rollers revolves; bearings in which the shafts carrying said friction-rollers are mounted; a strap; a sheave over which said strap passes; a bell-crank lever, one arm of which said strap engages, all so arranged and connected up that by the operation of said bell-crank lever said second-mentioned friction-rollers may be caused to be separated from one of said disks, and become engaged with the other, substantially as described.

4. In a motor; a pair of disks; a crank-shaft upon which said disks are mounted; a pair of friction-rollers adapted to engage with the opposite sides of said disks; shafts upon which said friction-rollers are mounted; a spring placed between and connected with the shafts upon which said friction-rollers are mounted; a rod placed transversely of said machine; bars connecting said rod with said shafts, respectively; a handle-bar connected with said rod, so arranged that by the movement of said handle-bar said friction-rollers may be moved to and from the circumference of said disks, substantially as described.

Signed at Gloversville, New York, this 27th day of July, 1904.

ZADOCK B. STARR.

Witnesses:
FRANK BURTON,
HERBERT M. VOSBURGH.